April 1, 1924.
C. A. BAUMLER
1,489,054
VEHICLE WHEEL
Filed May 13, 1921
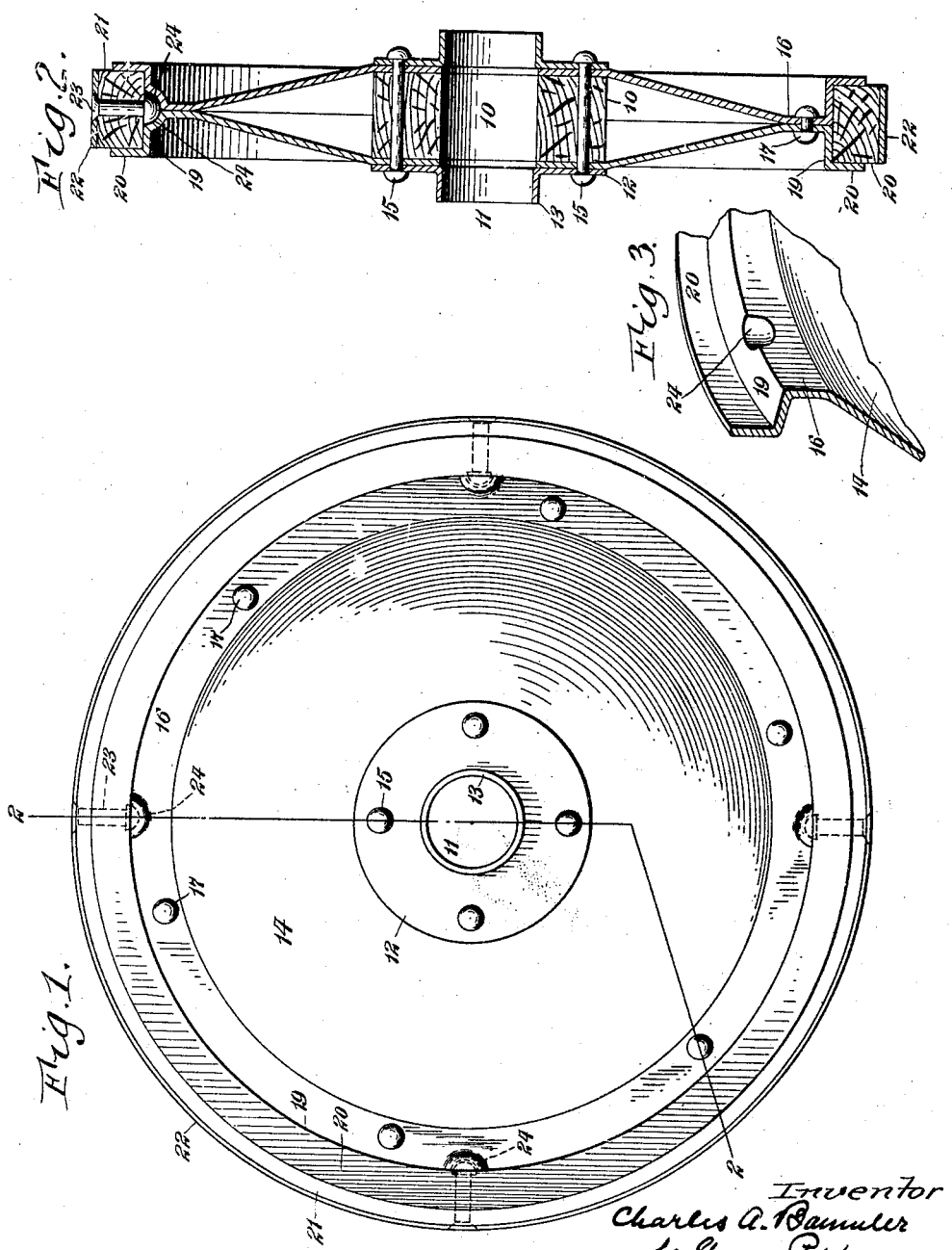
Inventor
Charles A. Baumler
by Geyer & Popp
Attorneys Patented Apr. 1, 1924.

1,489,054

UNITED STATES PATENT OFFICE.

CHARLES A. BAUMLER, OF BUFFALO, NEW YORK, ASSIGNOR TO AUTO-WHEEL COASTER COMPANY, INC., OF NORTH TONAWANDA, NEW YORK, A CORPORATION OF NEW YORK.

VEHICLE WHEEL.

Application filed May 13, 1921. Serial No. 469,343.

*To all whom it may concern:*

Be it known that I, CHARLES A. BAUMLER, a citizen of the United States, residing in Buffalo, in the county of Erie and State of New York, have invented new and useful Improvements in Vehicle Wheels, of which the following is a specification.

This invention relates to a vehicle wheel, and more particularly to a wheel which is used in toy wagons or toy automobiles for carrying children and which must therefore be subjected at times to much abuse and yet which must be inexpensive and simple in construction.

One of the objects of the invention is to produce a production or machine-made wheel in which the tire thereof is prevented from moving circumferentially relatively to the felly thereof, even though said felly has become considerably dried out and shrunken in the course of time. A further object of the invention is to provide an improved wheel which is principally composed of metal and yet which permits the use of wood at the hub and rim thereof so as to absorb the noise and vibration which would result from an all metal construction. A still further object of the invention is to automatically cause the parts to be locked against circumferential displacement by the assembling operation of pressing under considerable pressure the disk plates of the wheel together.

In the accompanying drawings:

Figure 1 is a side elevation of the improved vehicle wheel. Figure 2 is a diametrical section thereof taken on line 2—2, Fig. 1. Figure 3 is a fragmentary detail of the outer portion of one of the disk plates.

Similar characters of reference refer to like parts throughout the several views.

10 represents a ring or large washer-shaped hub which is preferably constructed of wood, fiber, or similar material for absorbing the noise waves and vibration of the wheel. Disposed coaxially on either side of said wooden hub are two metal hub rings 11 which are provided with the laterally extending annular flanges 12 and cylindrical, longitudinally, outwardly projecting supporting flanges 13 which together go to make up the hub proper of the wheel. Interposed between each of said metal hub rings 11 and the adjacent outer or end face of the wooden hub 10, is a disk plate 14. The pair of said disk plates, and the pair of hub rings 11 are secured to each other and to the wooden hub 10 by means of a plurality of longitudinal hub rivets 15, which pass completely through all of the aforementioned members and have their heads riveted down and bear against the outer faces of the lateral, annular flanges 12 of the hub rings 11.

The said disk plates 14 are somewhat conical in shape, their inner or central parts being separated or spread longitudinally apart somewhat by reason of the central hub 10, while their outer parts or circumferences meet with their flat faces 16 and are suitably joined together by means of a plurality of disk rivets 17. Outwardly of these flat faces 16, the circumferential edge of each of these disk plates is bent, at right angles sharply and longitudinally outwardly to form a lateral circumferential flange 19. The outer annular edge of the latter is, in turn, bent laterally outwardly to form a lateral retaining flange 20.

Disposed outwardly of the longitudinal circumferential flanges 19 of the disk plates and in between the retaining lateral flanges 20 thereof, is a felly 21 which is preferably constructed of wood or like noise wave and vibration absorbing material. This felly may, if desired, be made of a number of arcuate segments as is common practice in the wheelright art. A metal tire or circumferential rim 22 is arranged on the outer flat circumferential face of said felly. This metal rim and the wooden felly are held together by means of a plurality of rim rivets 23, whose outer heads are suitably countersunk in the periphery of the said rim and whose inner, projecting, semi-spherical heads bear against the inner face of said felly and project some distance radially inwardly therefrom. To accommodate these inner heads of said rivets and thereby prevent circumferential displacement of the rim and felly relatively to the disk plates 14, a plurality of pairs of semi-spherical notches 24 are formed in the periphery of said disk plates and at the opposing inner corner of the longitudinal flange 19 thereof, the companion notches of each pair registering longitudinally with each other and opening longitudinally in toward each other and opening radially outwardly and together forming a concavity which is of half-spherical shape.

In forming the disk plates 14, these semi-spherical notches 24 may either be formed prior to the assembling of the wheel, or else the said notches may be formed automatically in the assembling of the wheel in the following manner:

First the felly 21 and the metal tire are secured together by means of the tire rivets 23. Then the two metal disk plates 14 are placed on opposite sides of the felly with the wooden hub 10 disposed between the central parts of said disks. The disks are then pressed together under very heavy pressure which automatically forms the semi-spherical notches 24 on opposite sides of the inner round heads of the said tire rivets 23. Thereafter the hub rings 11 are placed in position and clamped together and to the disk plates and the hub 10 by the longitudinal hub rivets 15.

It is apparent that all of the metal construction of this improved vehicle wheel is a pressed or sheet metal proposition and therefore can be formed at low cost on a production basis, and likewise as to the wooden parts of the wheel. The wheel is relatively noiseless and vibrationless and extremely strong and durable and neat in appearance and no dirt or moisture can get into the space between the disk plates, so that the inner surfaces of the same are not exposed to oxidation. Furthermore, there are no apertures or openings in which a child's fingers can get caught and mutilated as occurs with the ordinary wooden spoke wheel.

I claim as my invention:

1. A vehicle wheel comprising a pair of disk plates each having a notch formed in its periphery, a felly arranged on the periphery of said disk plates and a plurality of rivets disposed radially and passing through said felly and each having its head disposed within the said notches of said disk plates.

2. A vehicle wheel comprising a pair of disk plates each having a notch formed in its periphery, a felly arranged on the periphery of said disk plates, a tire arranged on the periphery of said felly, and a plurality of radially disposed tire rivets passing through said tire and said felly and each having its head disposed within the said notches of said disk plates.

3. A vehicle wheel comprising a pair of disk plates having registering notches formed on their peripheries, a felly arranged upon the peripheries of said disk plates, a tire arranged on the periphery of said felly, and a plurality of tire rivets disposed radially and passing through said tire and felly and each having its head disposed within a pair of said registering notches of said disk plates.

4. A vehicle wheel comprising a pair of disk plates having companion registering semi-spherical notches which open longitudinally inwardly toward each other and which together open radially outwardly, a felly arranged on said disks, a tire arranged on said felly, and a plurality of tire rivets passing through said felly and said tire and each having its head disposed within a pair of said registering semi-spherical notches of said disk plates.

5. A vehicle wheel comprising a pair of disk plates each having a laterally disposed annular flange formed on its periphery and provided with a notch on one edge of said flange, a felly arranged on said flanges and a plurality of rivets secured to said felly and each having its head disposed within a pair of said notches.

6. A vehicle wheel comprising a pair of disk plates secured together and each provided on its periphery with a laterally extending annular flange and also having spherical registering notches, a felly arranged on said flanges, and radially disposed rivets passing through the said felly and each having a head disposed within one of said notches.

7. A vehicle wheel comprising a pair of disk plates provided on their peripheries with laterally extending annular flanges and a vertical flange at the outer edges of each of said annular flanges and also having pairs of semi-spherical registering notches formed at the opposing edges of said laterally extending annular flanges, a felly arranged upon said laterally extending annular flanges and retained between said vertical annular flanges, and tire rivets passing through said felly and said tire and having their heads disposed within the said semi-spherical notches of said disk plates.

8. A vehicle wheel comprising an annular felly, a rivet arranged radially in said felly and having a head at its inner end, and a pair of disk plates adapted to embrace opposite sides of said felly and to be secured together and to make a pressed fit around opposite sides of the head of said rivet.

CHARLES A. BAUMLER.